(12) United States Patent
Westover

(10) Patent No.: US 10,800,150 B2
(45) Date of Patent: Oct. 13, 2020

(54) METHOD AND APPARATUS TO REMOVE A PROTECTIVE LAYER

(71) Applicant: Ryan Westover, St. Augustine, FL (US)

(72) Inventor: Ryan Westover, St. Augustine, FL (US)

( * ) Notice: Subject to any disclaimer, the term of this patent is extended or adjusted under 35 U.S.C. 154(b) by 0 days.

(21) Appl. No.: 15/997,165

(22) Filed: Jun. 4, 2018

(65) Prior Publication Data
US 2018/0345645 A1   Dec. 6, 2018

Related U.S. Application Data

(60) Provisional application No. 62/514,472, filed on Jun. 2, 2017.

(51) Int. Cl.
  *B32B 43/00*   (2006.01)
  *B08B 1/00*    (2006.01)
  *B32B 38/10*   (2006.01)

(52) U.S. Cl.
  CPC .............. *B32B 38/10* (2013.01); *B08B 1/005* (2013.01); *B32B 43/006* (2013.01); *B08B 2220/01* (2013.01); *B08B 2220/04* (2013.01); *B32B 2605/18* (2013.01); *Y10T 156/1184* (2015.01); *Y10T 156/1961* (2015.01); *Y10T 156/1967* (2015.01)

(58) Field of Classification Search
  CPC ......... Y10T 156/1184; Y10T 156/1961; Y10T 156/1967; B08B 2220/01; B08B 2220/04; B32B 43/006
  See application file for complete search history.

(56) References Cited

U.S. PATENT DOCUMENTS

| | | | | |
|---|---|---|---|---|
| 4,858,264 | A * | 8/1989 | Reinhart | A47L 13/08 15/93.1 |
| 5,930,899 | A * | 8/1999 | Hartman | B25D 9/06 173/206 |
| 6,475,065 | B1 * | 11/2002 | Holmes | B23C 5/10 451/28 |
| 6,862,968 | B1 * | 3/2005 | Ogston | B23D 67/04 156/714 |
| 7,082,686 | B2 * | 8/2006 | Anderson | B26B 3/08 299/36.1 |
| 7,793,398 | B2 * | 9/2010 | Dumortier | E04F 21/0084 15/236.01 |
| 8,826,544 | B1 * | 9/2014 | Savage, Jr. | B26B 5/00 30/167 |
| 2013/0272809 | A1 * | 10/2013 | Childers, Jr. | B23C 5/10 408/124 |
| 2016/0377424 | A1 * | 12/2016 | Clark | G01B 11/303 356/600 |
| 2017/0259306 | A1 * | 9/2017 | Wiseman | F16B 37/14 |

* cited by examiner

*Primary Examiner* — Mark A Osele
(74) *Attorney, Agent, or Firm* — Joseph P. Kincart; Rogers Towers, P.A.

(57) ABSTRACT

The present invention provides method and apparatus for removing a sealant from a surface. More specifically the present invention provides methods an apparatus for efficiently and consistently removing polysulfide sealant from a surface on an aluminum airplane wing without damaging the wing.

24 Claims, 9 Drawing Sheets

SMALLER DIAMETER
TOOL OPTION

Offset from Center

BLADE SERRATIONS OPTIONAL FOR ANY BLADE.

METHOD AND APPARATUS TO REMOVE A PROTECTIVE LAYER

CROSS REFERENCE TO RELATED APPLICATIONS

The present application claims priority to Provisional Patent Application Ser. No. 62/514,472, filed Jun. 2, 2017 and entitled Method and Apparatus to Remove a Protective Layer, the contents of which are relied upon and incorporated herein by reference.

FIELD OF THE DISCLOSURE

The present disclosure relates to methods and apparatus to remove a layer of material, such as protective layer, from a substrate.

BACKGROUND OF THE DISCLOSURE

Objects and materials often have a layer of material (e.g., a coating) over a substrate material, in order to seal and/or protect the substrate material. For example, major aircraft components may be constructed from aluminum with a polysulfide surface coating.

At times, there may be a need to remove the coating, e.g., to refinish the coating, to repair damage to the coating or the substrate, and so forth. Known techniques for coating removal are often tedious or time consuming, such as sanding or scraping with a razor blade. Such removal techniques also incur a risk of damaging the substrate, such as scuffing the substrate if sanding, or gouging the substrate if scraping with a razor blade. Therefore, a need exists for a fast method and apparatus to remove a layer of material on a substrate, without damaging the substrate.

SUMMARY OF THE DISCLOSURE

Embodiments in accordance with the present disclosure provide a fast method and apparatus to remove a layer of material on a substrate, without damaging the substrate. In some preferred embodiments, the present invention provides for removal of a polysulfide sealant for an interior surface of an airplane wing. In some embodiments, the method and apparatus are usable to remove a coating (e.g., a polysulfide coating) from a substrate. The substrate may be, for example, an aluminum skin used for an aircraft, a wooden or fiberglass boat hull, and so forth.

In some embodiments, a method is provided for removing sealant from a surface of an airplane wing, via determining a relative modulus of a blade to a material comprising the airplane wing and choosing a blade with a modulus lower that the material comprising the airplane wing. The blade can be secured in a blade holder formed in a functional shank and the functional shank and blade holder may be attached to a source of linear impact force. The tool may be deployed with the functional shank and blade placed against the sealant with a repetitive linear force of sufficient force to remove the sealant from the airplane wing, but insufficient force to damage the wing of the airplane. The material of the airplane wing may include aluminum. The blade may include a plastic material such as one or more of: carbon fiber and Plexiglas™. Guides may align the blade with corresponding features in the blade holder.

In some embodiments, a blade edge may be redefined by grinding the blade edge. Enough force may be applied to the blade to fracture the blade along an artifact designed to prevent application of threshold amount of force.

A blade may be chosen with a particular width based upon an area of the airplane wing from which the sealant will be removed.

In such fashion, a sealant may be removed from a surface interior to an airplane wing by fixedly attaching a blade into a chuck of an air hammer wherein the blade comprises a material with greater malleability than the surface interior to the airplane wing; placing the blade against an interface of a layer of sealant adhered to the surface interior to the airplane wing and the surface interior to the airplane wing; applying a series of pulsating movements to the blade with the air hammer; and causing the sealant to separate from the surface interior to the airplane wing.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

The drawings are not necessarily drawn to scale unless clearly indicated otherwise. Dimensions, where shown, are typical dimensions in units of inches.

DETAILED DESCRIPTION

In the following sections, detailed descriptions of examples and methods of the disclosure will be given. The description of both preferred and alternative examples though thorough are exemplary only, and it is understood that to those skilled in the art that variations, modifications, and alterations may be apparent. It is therefore to be understood the examples do not limit the broadness of the aspects of the underlying disclosure.

Embodiments in accordance with the present disclosure provide consistent and efficient methods and apparatus to remove a layer of material on a substrate, without damaging the substrate. In some preferred embodiments, the present invention includes a Plexiglas™ blade with cyclical linear motion being applied to an interface of a sealant adhered to an airplane wing interior surface and that airplane wing surface. In some embodiments, the apparatus may include a contact edge surface caused to repeatedly move with a linear movement along a plane adjacent to a surface in order to remove the layer of material (sealant) adhered to the surface. The hardness, malleability, brittleness or similar qualities of the contact edge surface may be selected based upon corresponding characteristics of the layer of material and the substrate.

A shape of the tool and blade as well as a direction of force exertion and magnitude of force exertion may also be controlled to prevent damage to the substrate. For example, if removing a layer of poly sulfide from aluminum, the contact edge surface should be harder than polysulfide. However, given the direction of applying force when using the tool (typically at a relatively shallow angle close to parallel to the substrate), the hardness of the contact edge surface should not gouge or deform the substrate (i.e., produce a "ding"). The contact edge surface may be harder than the substrate if used for shallow angle configurations. In some embodiments, the contact edge surface may include features that may cause an intentional break of the contact edge surface before the substrate surface is damaged, e.g., by use of a brittle break-away portion, or grooves, perforations, weak spot or the like to provide a breakaway portion, or the like.

In some embodiments, the shape of the contact edge surface may be contoured to match a non-planar shape of the substrate. For example, if removing a surface layer from a boat hull, the contact edge surface may have a curvature to match at least a portion of the boat hull surface. A convex corner edge also may have a contoured tool body.

Figure 1:
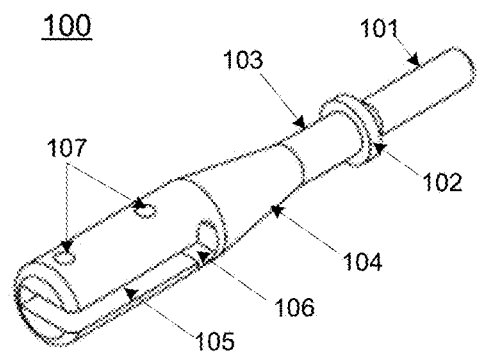
FIGS. 1-1D illustrate various views of an apparatus in accordance with embodiments of the present invention.

Referring now to FIGS. 1 through 1E, various views of an apparatus according to the present invention are illustrated. At FIG. 1, a perspective view of an apparatus 100 is illustrated that may be used in conjunction with a repetitive striking tool, such as a pneumatic hammer or an electric hammer (sometimes referred to as an electric demolition hammer) to remove expired protective coatings installed against a relatively soft base, such as a coating inside the wing of an airplane wing. The airplane wing (not shown) is typically aluminum or an alloy that is light weight and softer than a steel chisel blade, such as those know in the art. The repetitive striking tool is used to repeatedly drive the apparatus 100 against a layer of material to be removed while the lack of rigidity of the apparatus 100 prevents damage to the soft wing.

Lateral force 113 is applied to the functional shank 101 and transferred through the apparatus 100 to the contact edge surface 112 such the contact edge surface is moved laterally forward with a striking force 114. However, a flexible nature of the blade 109 and relative softness of the blade 109 and contact edge surface 112 as compared with airplane wing 115. A coating 116 is separated from the airplane wing 115 as a result of the contact edge surface 112 moving laterally forward with a striking force based upon the lateral force 114 applied to the apparatus 100.

The apparatus my include a functional shank 101 that includes size and shape conducive for coupling to the repetitive striking tool. As shown, the functional shank 101 includes a terminal end that may be inserted into a chuck on the repetitive striking tool and connective end that is bordered by a collar 102. In some preferred embodiments, the functional shank 101 includes a round cross section, such that the functional shank 101 takes on the shape of a cylindrical dowel. The collar 102 may also be round (although other shapes are within the scope of the invention). The collar 102 will have a greater diameter, or otherwise exceed the diameter of the functional shank 101.

A transition shank 103 is linearly positioned between the collar 102 and a blade holder 108. The transition shank 103 preferably also includes a round cross section, although other shapes are also within the scope of the invention. In some embodiments, a tapered portion 104 of the transition shank 103 allows the apparatus to couple to the repetitive striking tool with a first diameter portion and secure a blade 109 at a second diameter of the apparatus 100.

In some embodiments, a score or other artifact 114 is created in one or more of a functional shaft, a transitional shank and/or a blade to limit an amount of lateral force that may be applied through the apparatus.

The apparatus 100 may also include a blade holder 108 portion that is linearly attached to the transition shank 103 via the tapered portion 104. The blade holder portion 108 includes a blade channel 105 for receiving a blade 109. A proximal end of the blade channel 105 may terminate against the transition shank 103. In some embodiments, the blade channel 105 may widen into an access slot 106 in the area for receiving the proximal end of the blade 109. The access slot 106 is useful to pry the blade out of the blade channel 105 and also to clear debris that may accumulate in the blade channel 105. The access slot 106 may include an arcuate or angular cut away when viewed from a top down perspective.

Figure 1A:
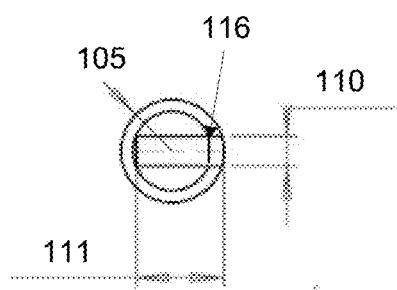
Figure 1B:
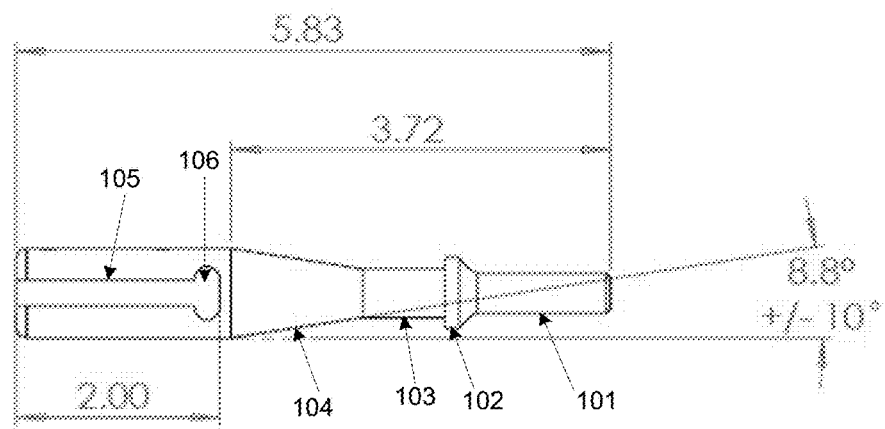
Figure 1C:
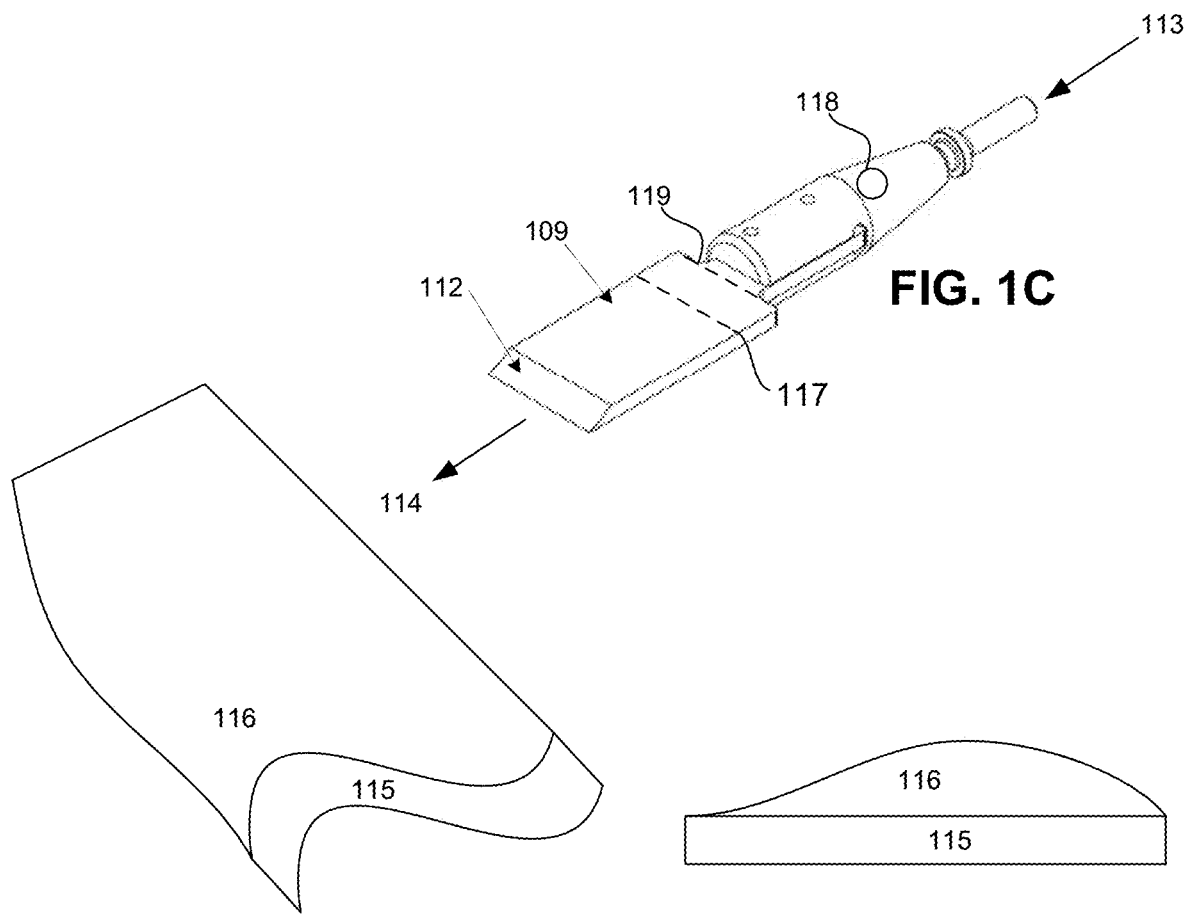

As shown in FIG. 1A, the blade channel 105 may include a height 110 and width 111 dimensioned to receive a blade 112 (shown in FIG. 1C). Preferably the dimensions are closely tolerance to the height 110 and width of the blade 112 such that friction between the blade 112 and the blade holder 108. Exemplary dimensions may include a height 110 of between about 1/8" and 3/8" with a preferable height about 1/4" inch. Exemplary width 111 may be between about 1/2" and 1 1/2".

In another aspect, a securing device may be inserted through a securing via 107 and fixedly attach the blade 112 to the blade holder 108. A securing device may include, by way of non-limiting example one or more of: a set screw, a roll pin, a dowel, a rivet and a nut and bolt. Preferable, the securing device is removable allowing the blade to be removably attached in a fixed manner to the blade holder 108.

Referring now to FIG. 1B, an exemplary slope 112 of transition in a tapered portion 104 may be between about 2 degrees and 20 degrees. Other designs may include an arc or perpendicular transition portion.

Figure 1D:
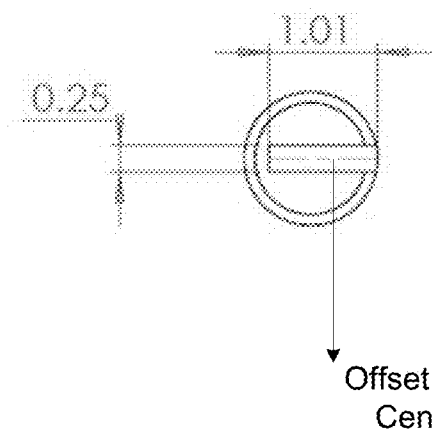

FIGS. 1D and 1E illustrate alternative embodiments for securing a blade 109 within a blade holder. FIG. 1D illustrates the blade 109 secured in an offset manner 115 within the blade holder 108; and FIG. 1A includes a centered mounting 116 of the blade 109 within the blade holder 108.

During use, the functional shank 101 is removably coupled to a source of repetitive impact, such as the impact provided by a pneumatic air hammer (not shown) or an electric hammer tool.

The tool body may be fashioned from a material with a relatively high modulus, such as steel. The tool blade 112 is preferably lower modulus and should be of a lower modulus than a material of a surface on which it will be deployed. For example, an aluminum airplane with a insulation coating may be worked upon with a blade 112 that is fashioned, at least in part from a plastic, such as acrylic, Plexiglas™, carbon fiber, polymer, polystyrene, polyethylene, polyvinyl chloride, polypropylene or other material that is malleable or semi-malleable and still hold an edge. A wide variety of synthetic and semi-synthetic compounds may therefore be used to fashion the blade 112.

Each apparatus comprising a tool insert includes a contact edge surface 112, and various of tool inserts may differ by width of their respective contact edge surface 112. Tool inserts may vary with different shank lengths, different blade lengths, different blade widths, different contact edge surface slopes, different blade modulus, different blade break off force and other mechanical variations. A particular variation may be chosen to accomplish a particular task, such as to access different parts of a work piece (the work piece being a substrate and surface layer being worked upon to remove the surface layer). The size of specific tool may be selected based upon the size of a piece to be worked for surface material removal. Tool inserts are designed to slide axially along a lateral axis, within blade holder 105.

The respective contact edge surfaces typically are sharp, in order to dig into the surface layer material, but not so sharp and/or hard to dig into the substrate material using the expected force of application. A sharp contact edge also may be helpful to cut any material that may be cuttable, such as when removing a surface layer of wallpaper from drywall. The contact edge surface may be grindable in order to maintain a sharp edge. In some embodiments, the contact edge surface may be made from a material such as plexiglass, carbon fiber, or another material selected based upon its mechanical properties compared to the substrate and surface layer. In some embodiments, the contact edge surface may be made from a material that avoids or minimizes generation of static electricity.

In some embodiments, the tool blade 109 may include a minimum length indicator 117, such that as the tool insert is grinded over time to maintain sharpness, the tool insert will not be used beyond a minimum length of tool insert. A minimum length indicator 117 may be based upon a decrease in flexibility and resulting increase in modulus of the blade 112 as the blade 112 is shortened. The present invention provides for a threshold level of flexibility to avoid damage to a wing 115 or other working surface.

Figure 2:
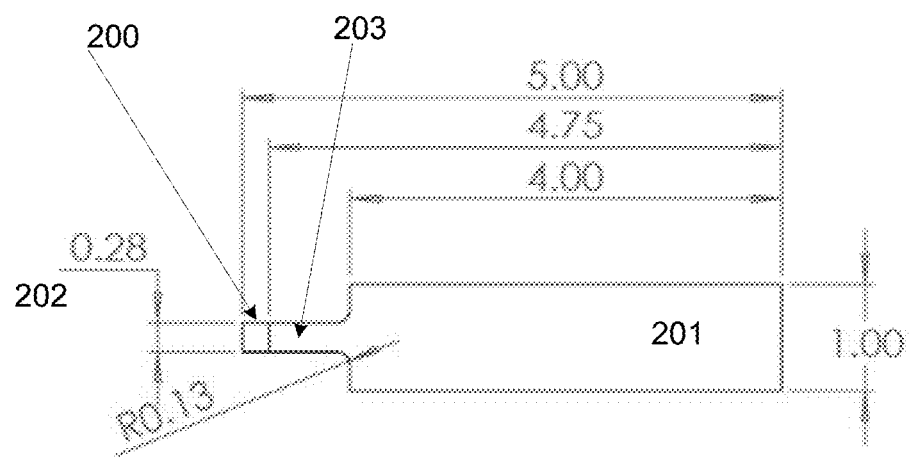
FIG. 2-2D illustrate various views of an apparatus in accordance with embodiments of the present invention with a tool body more wide than a contact edge surface.
Figure 2A:
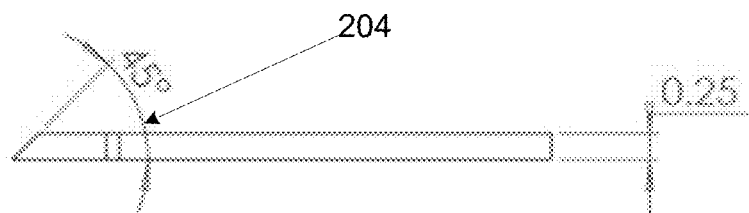
Figure 2C:
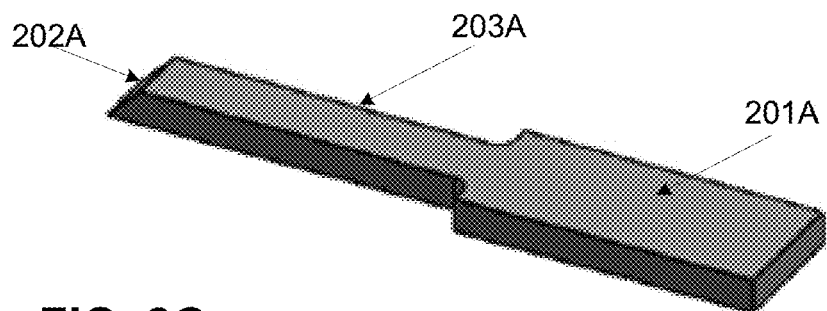
Figure 2D:
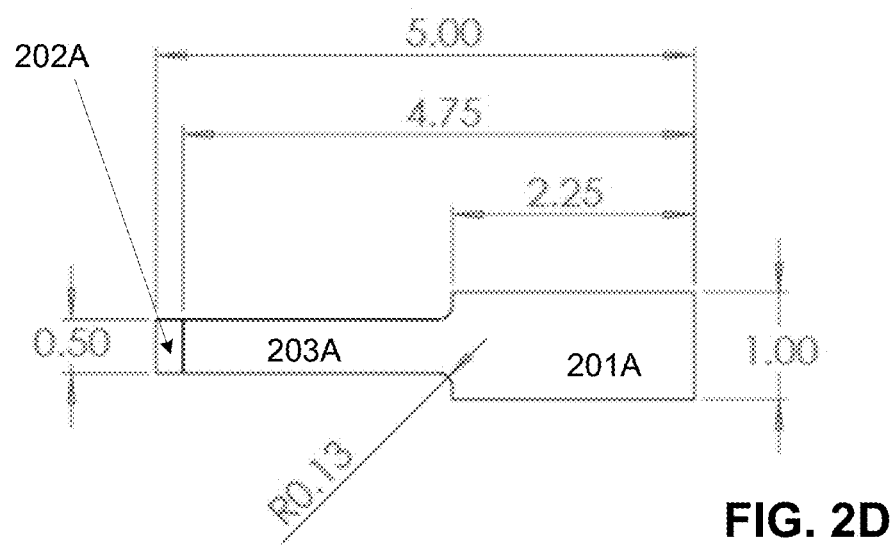

FIGS. 2 through 5 illustrate various implementations of the present invention. At FIGS. 2-2D, a blade body 201 is shown with a greater width than a blade contact edge surface 202. As illustrated, a blade extension 203 is less wide than the blade body 201. Exemplary dimensions include a blade body 201 that is 1.00 inches wide and 4.00 inches long, the blade extension 203 is 0.28 inches wide and 0.75 inches long. A blade contact surface 202 may be 0.28 inches wide and 0.25 inches long. FIG. 2A illustrates that the contact edge 202 may be at an angle of 45 degrees.

Figure 3:
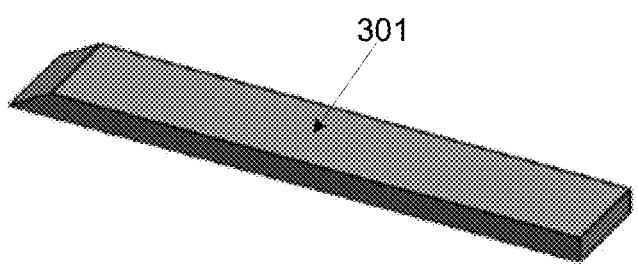
FIG. 3-3B illustrate various views of an apparatus in accordance with embodiments of the present invention with a tool body of a same width as a contact edge surface.
Figure 3A:
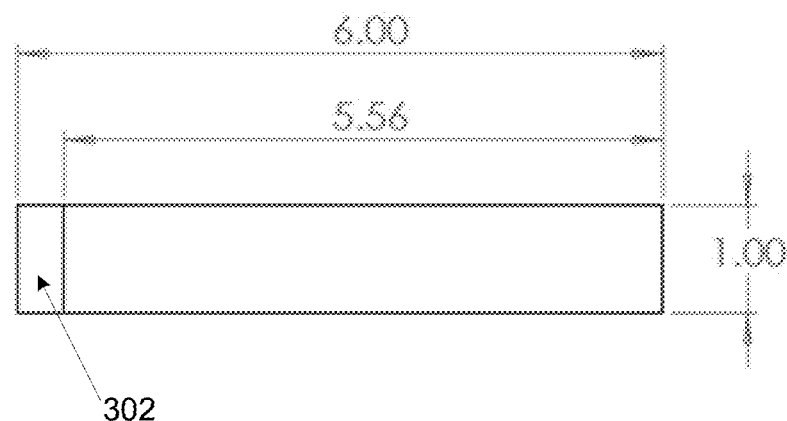
Figure 3B:
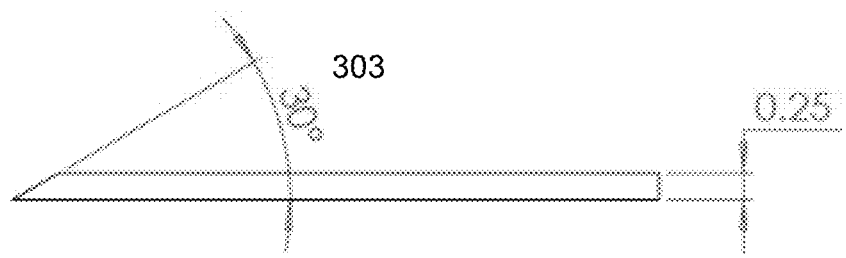

Referring now to FIGS. 3-3B, various views illustrate embodiments of the present invention with a uniform blade body 301 and blade contact edge 302. As illustrated the edge is shown at an angle of 30 degrees 303. Blade edges in general may be adjusted to a particular set of circumstances, and will typically range from between 10 degrees and 45 degrees.

Figure 4:
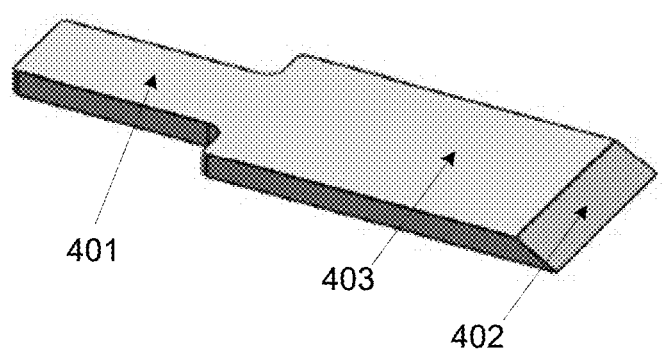
FIG. 4-4B illustrate various views of an apparatus in accordance with embodiments of the present invention with a tool body more narrow than a contact edge surface.
Figure 4A:
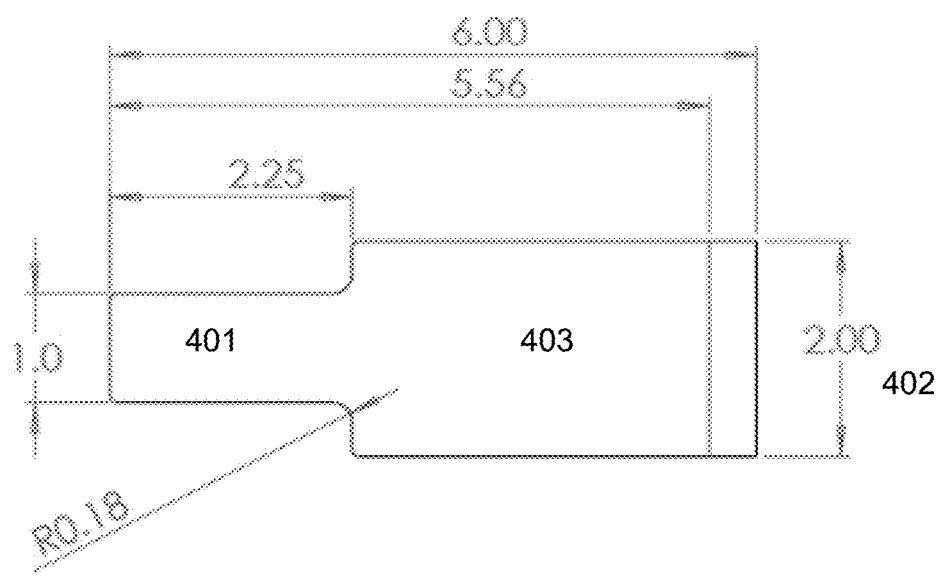
Figure 4B:
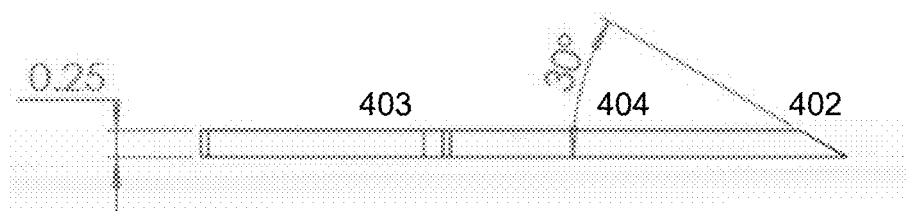

Referring now to FIGS. 4-4B various views illustrate embodiments of the present invention with a blade body 401 that is more narrow than an associated blade contact edge 402 and corresponding extension 403. The blade edge may be at an angle of 30 degrees 404.

Figure 5:
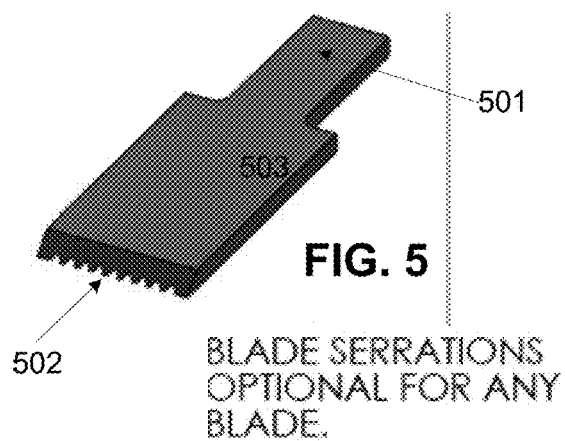
FIG. 5-5D illustrate various views of an apparatus in accordance with embodiments of the present invention with a blade including serrations according to some embodiments of the present invention.
Figure 5A:
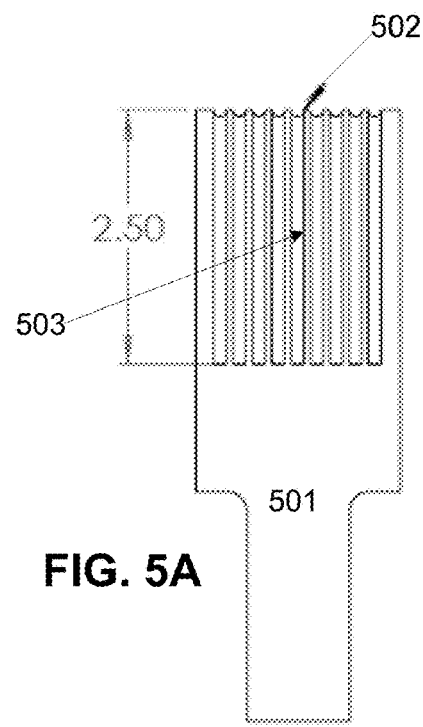
Figure 5B:
Figure 5C:
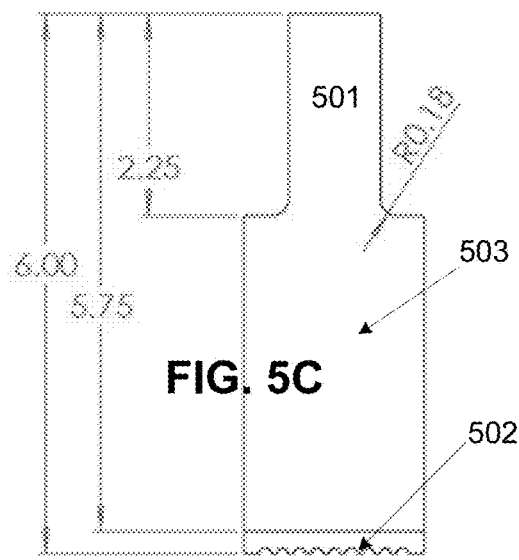
Figure 5D:
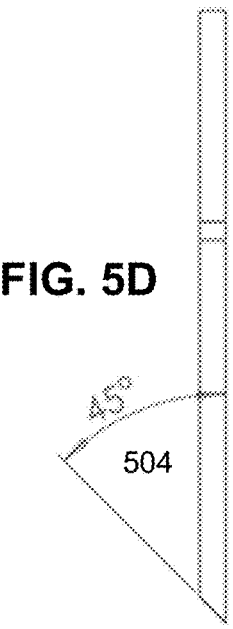

Referring now to FIGS. 5-5D various views illustrate embodiments of the present invention with a blade body 401 that includes ridges. As illustrated, one or more tool inserts may include a respective set of ridges 502, which may couple with a matching set of ridges (not show) within a tool blade 503. Ridges 502 may be used to facilitate the sliding of a tool insert within a blade holder, by guiding the direction and optionally limiting the travel with a mechanical stop. Length of ridges 502 may be selected to provide a configurable amount of travel within a corresponding blade holder (not shown in FIG. 5-5D). Ridges may also be functional to provide more contact surface between the tool body and the blade and thereby increase the transfer of impact force from the tool body to the blade 501. The amount of travel may be used to control how much surface material is removed with each stroke of the tool insert. Ridges 502 also may be used to provide strength to the tool insert, and help prevent bending of the tool insert when it is being pressed against a work piece. A contact edge with ridges may be positioned at about 45 degrees 504.

Figure 6:
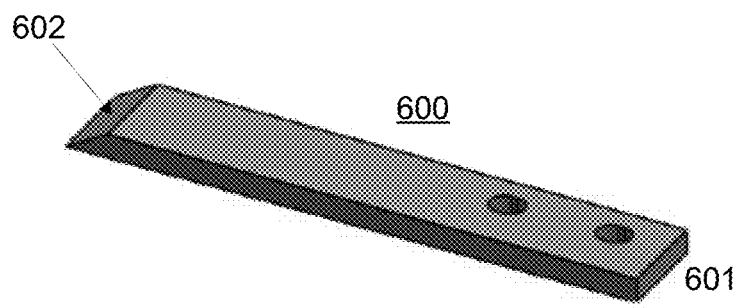
FIG. 6-6A illustrate views of a blade including restraint holes.
Figure 6A:
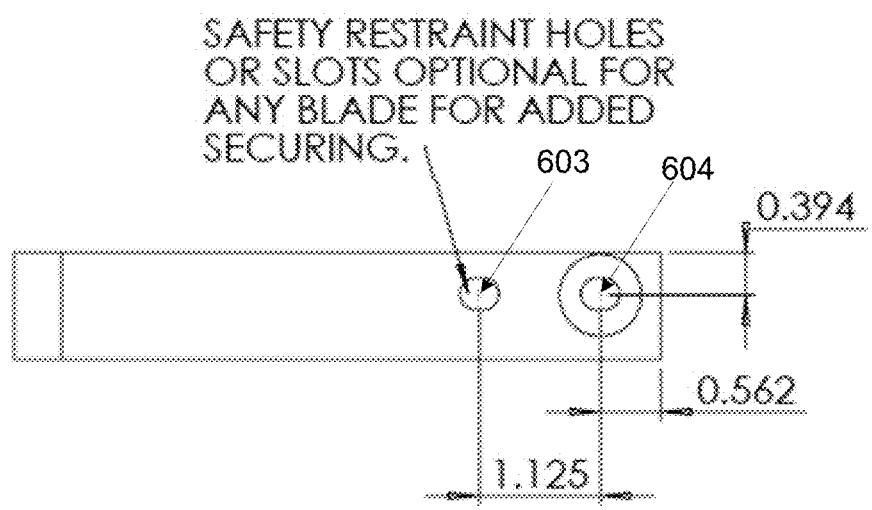

Referring now to FIGS. 6-6A, in some embodiments, one or more safety restraint holes 603-604 may be placed through the blade 601. The safety restraint holes 603-604 may be used in conjunction with a fastener, such as a rivet, bolt, roll pin, clevis pin or other removable fastener. As illustrated the restraint holes are located at a proximate end 601 of the blade 600 with a contact edge 602 at a distal end of the blade 600.

Figure 7:
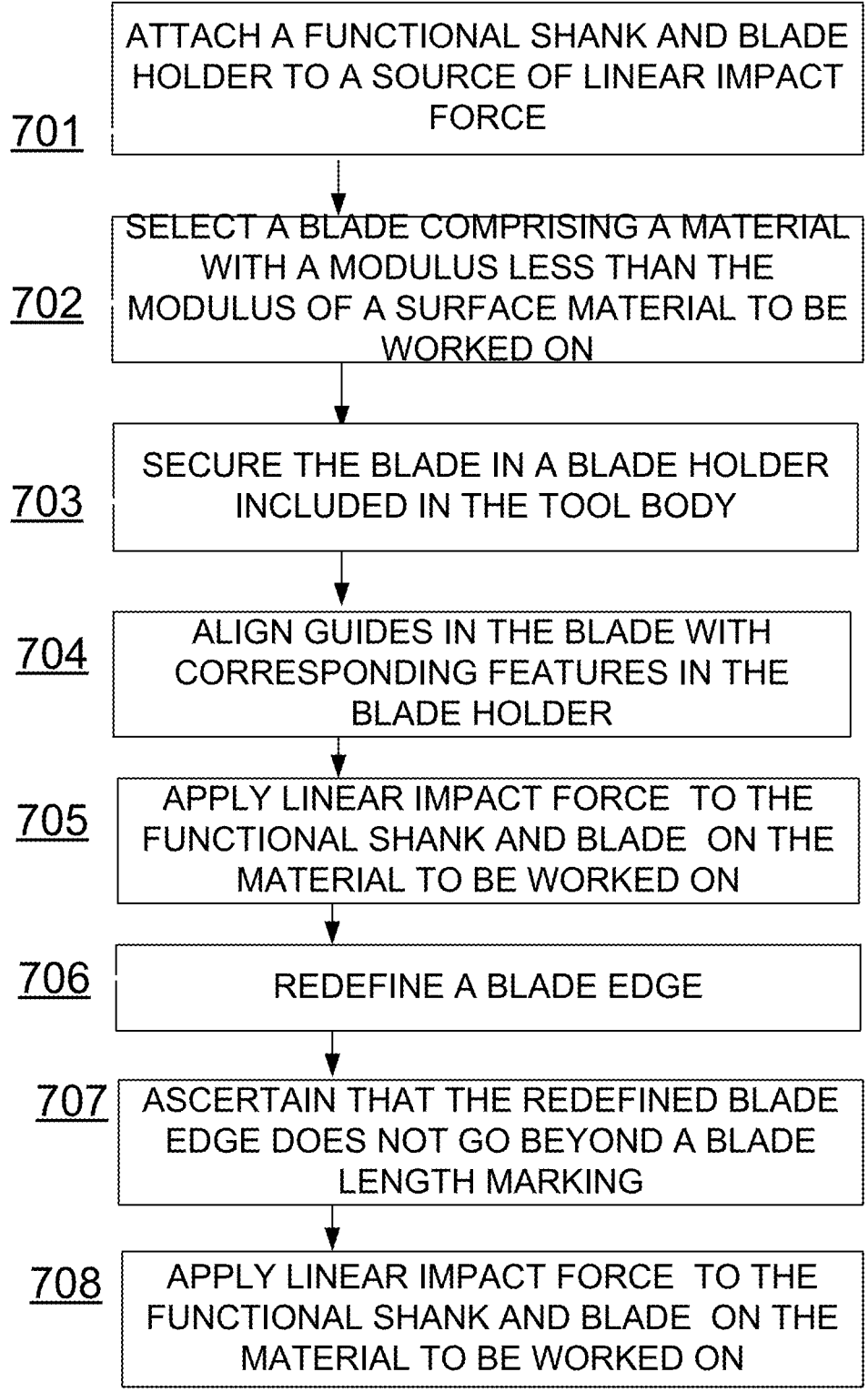
FIG. 7 illustrates a block diagram of method steps according to some embodiments of the present invention.

Referring now to FIG. 7, method steps are listed that may be used in various implementations of the present invention. At step 701, a tool body may be attached to a source of linear impact, such as an air hammer or electric hammer. At step 702, a modulus of a blade relative to a material to be worked upon may be determined. In general, according to the present invention, a modulus of the blade will be less than the modulus of the material to be worked upon. At step 703, a blade is chosen with a modulus that is less than the material to be worked on.

At step 704, a chosen blade is secured in a blade holder. The blade holder may be included in the tool body. A blade shape is based generally upon a task to be completed. For example, a shape of a tool blade will depend upon an area for which a coating is to be removed and the relative ease of access to an area containing the coating.

At step 705, in some embodiments guides in the blade may be aligned with corresponding features in the blade holder. At step 706 the tool body and blade is deployed in a manner that allows impact energy received into the tool body to be transferred to the tool blade that is chose with a modulus less than the modulus of the material to be worked on. Deployment may specifically include, for example, removal of a polysulfide coating from the interior surface of an airplane wing or other surface. According to the present invention, an amount of force may be consistently and efficiently transferred to a contact blade edge removing material, such as a polysulfide coating. A repetitive force impact device may be set to deliver consistent pressure with each blow, unlike a blade that is wielded via manual application of force, which is highly subjective and inconsistent. In addition, the present invention provides that if a maximum acceptable force is exceeded, the blade will automatically intercede before destruction of an airplane wing from which the polysulfide coating is being removed. The blade intercedes by virtue the blades lover modular such that the blade will break before it is able to deliver a force capable of damaging the airplane wing.

In some embodiments, a score or other artifact is created in a functional shaft and/or a blade to limit an amount of lateral force that may be applied through the apparatus.

At step 707, after deployment of the blade, the blade edge may be redefined, such as via grinding a new edge onto the blade. At step 708, a position of the new edge is compared to a length marking to ascertain whether the redefined blade edge is suitable for a task at hand. Ascertaining whether a shortened blade is suitable may be contingent upon a new modulus of the shortened blade and a relative modulus of the material to be worked upon. Other considerations may include an overall length of the tool and blade and the access needs of an area to be worked upon. For example, a constricted area may need a longer blade.

In operation, an energy source (e.g., a pneumatic source, or an electrically/magnetically driven linear actuator) may provide a force that pushes tool insert forward (i.e., to the left in FIG. 1A) and thereby tends to scrape off at least a portion of the surface material. The energy source is not continuous (e.g., may be pulsed or provided upon operator control). When the energy source is not providing a force, an operator of apparatus 100 may move apparatus 100 forward (i.e., to the left in FIG. 1A), thereby causing the selected one of tool insert to retract within tool insert holder 2, and positioning apparatus 100 for the next application of energy or force. A spring also may be provided within tool insert holder 2 in order to help retract the tool insert.

Apparatus 100 may include one or more vibration sensors (e.g., a single sensor or a three-axis sensor, etc.). The vibration sensor 113 may be used to detect anomalous vibrations during operation of apparatus 100, such anomalous vibrations that may be indicative of a tool that has had a piece broken off, or is being used against an inappropriate substrate (e.g., a mismatch in mechanical properties such as hardness, rigidity, pliability, malleability, stiffness, brittleness or the like), and so forth. The amplitude and frequency spectrum of the vibrations may be monitored. The desire is that if apparatus 100 is used with too much force against a work surface to be cleared of a surface layer, it is the surface of the tool that will give way, not the work surface. If a piece of apparatus 100 has given way, this condition may be detectable from a change in vibration characteristics. An automatic shutoff may be provided to shut off operation upon detection of an anomalous condition.

In addition, a blade may be chosen with a relative modulus less than an on which work will be performed. Modulus may include, for example, Young's modulus, or the elastic modulus, and includes a metric quantifying a stiffness of a material and includes a relationship between stress (force per unit area) and strain (proportional deformation) of a material. Less modulus in the blade allows for deformation to take on the blade instead of the item to be worked. The blade may be periodically reshaped, such as sharpened, to remedy aberrations resulting from its deployment as an impact tool. Reshaping may shorten the overall length of the blade.

Additional embodiments may include an energy coupler for limiting an amount of energy transferred. In some embodiments, a receiving slot may include one or more longitudinal guides for aligning and securing the blade within the blade holder. The longitudinal guides may be concave or convex in relation to a planar surface of the receiving slot.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring such operations be performed in the particular order shown or in a sequential order, or all illustrated operations be performed, to achieve desirable results.

Certain features described in this specification in the context of separate embodiments can also be implemented in combination in a single embodiment. Conversely, various features described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood the described program components and systems can generally be integrated together in a single software product or packaged into multiple software products.

Thus, particular embodiments of the subject matter have been described. Other embodiments are within the scope of the disclosure. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the disclosure.

In certain implementations, multitasking and parallel processing may be advantageous. Nevertheless, it will be understood that various modifications may be made without departing from the spirit and scope of the disclosure.

What is claimed is:

1. A method for removing sealant from a surface of an airplane wing, the method comprising:
   a. determine a relative modulus of a blade to a material comprising the airplane wing;
   b. choose a blade with a modulus lower that the material comprising the airplane wing, wherein the blade comprises one or more ridges;
   c. secure the blade in a blade holder formed in a functional shank;
   d. attach the functional shank and blade holder to a source of linear impact force; and
   e. deploy the functional shank and blade against the sealant with a repetitive linear force of sufficient force to remove the sealant from the airplane wing, but insufficient force to damage the wing of the airplane, wherein the repetitive linear force is provided by an electric hammer.

2. The method of claim 1, wherein the material comprising the airplane wing comprises aluminum.

3. The method of claim 2 wherein the blade comprises a plastic material.

4. The method of claim 3 wherein the blade comprises polymethyl methacrylate.

5. The method of claim 2 wherein the blade comprises carbon fiber.

6. The method of claim 1 additionally comprising the step of aligning guides in the blade with corresponding features in the blade holder.

7. The method of claim 1 additionally comprising the step of redefining a blade edge by grinding the blade edge.

8. The method of claim 1 additionally comprising the step of choosing a blade with a particular width based upon an area of the airplane wing from which the sealant will be removed.

9. The method of claim 1, wherein the repetitive linear force is not applied continuously.

10. A method for removing sealant from a surface of an airplane wing, the method comprising:
    a. determine a relative modulus of a blade to a material comprising the airplane wing;
    b. choose a blade with a modulus lower that the material comprising the airplane wing;
    c. secure the blade in a blade holder formed in a functional shank;
    d. attach the functional shank and blade holder to secure a linear impact force;
    e. deploy the functional shank and blade against the sealant with a repetitive linear force of sufficient force to remove the sealant from the airplane wing, but insufficient force to damage the wing of the airplane, wherein the repetitive linear force is provided by an electric hammer; and
    f. fracture the blade by applying enough force to break a force-control feature of the blade.

11. The method of claim 10, wherein the force-control feature comprises a brittle break-away portion.

12. The method of claim 10, wherein the force-control feature comprises a structural weakness of the blade.

13. The method of claim 10, wherein the blade comprises a sufficiently flexible material to avoid damage to the wing.

14. The method of claim 10, wherein the blade further comprises one or more ridges.

15. The method of claim 14, wherein the blade further comprises one or more safety restraint holes.

16. The method of claim 10 wherein the material comprising the airplane wing comprises aluminum.

17. The method of claim 16 wherein the blade comprises polymethyl methacrylate.

18. The method of claim 10 wherein the blade comprises a plastic material.

19. The method of claim 10 wherein the blade comprises carbon fiber.

20. The method of claim 10 additionally comprising the step of aligning guides in the blade with corresponding features in the blade holder.

21. The method of claim 10 additionally comprising the step of redefining a blade edge by grinding the blade edge.

22. A method for removing sealant from a surface interior to an airplane wing, the method comprising the steps of:
    a. Fixedly attaching a blade into a chuck of an air hammer wherein the blade comprises a material with greater malleability than the surface interior to the airplane wing;
    b. placing the blade against an interface of a layer of sealant adhered to the surface interior to the airplane wing and the surface interior to the airplane wing;
    c. applying a series of pulsating movements to the blade with the air hammer;
    d. causing the sealant to separate from the surface interior to the airplane wing; and
    e. fracturing the blade based upon applying enough force to break a force-control feature of the blade.

23. The method of claim 22, wherein the force-control feature comprises a brittle break-away portion.

24. The method of claim 22, wherein the force-control feature comprises a structural weakness of the blade.

* * * * *